United States Patent [19]

Hirose et al.

[11] Patent Number: 4,516,348
[45] Date of Patent: May 14, 1985

[54] TRAWLING LINE INFORMATION COMMUNICATION SYSTEM

[75] Inventors: Haruomi Hirose, Tokyo; Akio Yamazaki, Saitama, both of Japan

[73] Assignee: Daiwa Seiko Co., Ltd., Tokyo, Japan

[21] Appl. No.: 522,855

[22] Filed: Aug. 12, 1983

[30] Foreign Application Priority Data

Aug. 18, 1982 [JP] Japan .................................. 57-143098

[51] Int. Cl.³ ............................................. A01K 97/12
[52] U.S. Cl. ............................................. 43/17; 43/4
[58] Field of Search ................ 43/4, 4.5, 17; 340/539, 340/573, 870.03, 870.16, 870.19; 242/84.1 M, 84.52 A

[56] References Cited

U.S. PATENT DOCUMENTS

| | | | |
|---|---|---|---|
| 4,011,551 | 3/1977 | Adler | 340/870.19 |
| 4,242,666 | 12/1980 | Reschovsky | 340/870.19 |
| 4,384,427 | 5/1983 | Christiansen | 43/4 |
| 4,408,204 | 10/1983 | Salvesen | 340/870.19 |
| 4,422,258 | 12/1983 | Adams | 43/17 |

Primary Examiner—Nicholas P. Godici
Assistant Examiner—C. McKee
Attorney, Agent, or Firm—Flam & Flam

[57] ABSTRACT

An information system for trawler operation includes a radio link between the bridge or other vessel control station and each of a plurality of fishing devices on the vessel. Each fishing device has a radio transmitter that sends signals from which the vessel operator can determine for such fishing device, such variables as line speed, line tension, line payout and the like. Suitable sensing mechanisms are provided together with appropriate electrical circuitry.

1 Claim, 6 Drawing Figures

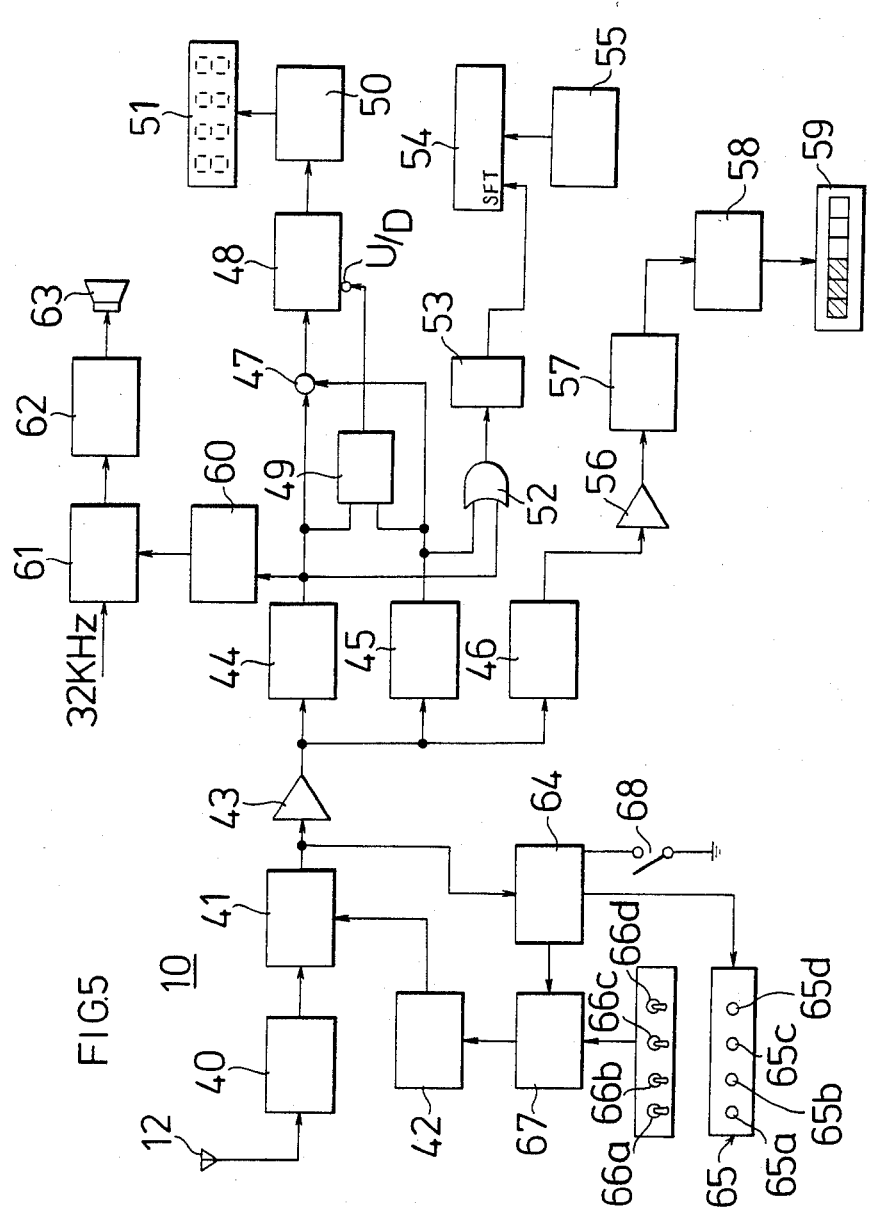

TRAWLING LINE INFORMATION COMMUNICATION SYSTEM

FIELD OF INVENTION

This invention relates to a communication system applied when trawling on a cruiser, etc., and more particularly, to a trawling line information communication system used when informing, with radio means, a vessel operator on a bridge of the condition of a fishing line when a fish is caught with a fishing device on the line tip drawn out from the reel of a trawling rod operated by a fishing person on the deck while fighting the fish.

BACKGROUND OF THE INVENTION

Generally, in trawling by a cruiser, etc., a fishing line drawn out from a reel attached to a trawling rod is drawn out into the sea water from the tip of the rod through a clip after mounting the rod on the deck of a vessel, and if a large fish such as a swordfish, a tunny or a yellowfin tuna, etc., swimming near the sea surface is caught by a fishing device on the tip of the fishing line during the sailing of the vessel, the fishing line is separated from the clip and is drawn out from the reel responding to tension caused by the tug of the fish and the sailing of the vessel. In such a case, it is feared that a fishing line may be cut or a fish, once caught with much effort, may get away because the mouth part of it may be torn off unless a vessel runs responding to the delivery speed of the fishing line and tension is applied to it. Accordingly, a vessel operator must operate the vessel so as to be able to obtain a condition where a fishing line is not cut and a fishing person can wind the line while quickly inferring the delivery speed of the fishing line, applying tension to the line and the amount of the delivered line. However, in conventional trawling it could be judged only by a fishing person taking part in fishing whether a fish was caught by a fishing device when a vessel travels or not, or whether the fish caught is large or small, and it is the state of things that a vessel operator is indirectly informed of said situations by talking to the fishing person. For this reason, a vessel operator cannot operate the vessel responding to the delivery speed of a fishing line, the delivered amount thereof and the tension, so that a fishing person may sometimes lose the fish once caught. Accordingly, it is desired that a vessel operator is directly informed of the condition of fishing without the aid of the fishing person and, thereafter, operates the vessel replying to the condition of the fishing.

The purpose of this invention, in view of the above described difficulties, is to offer the vessel operator a means of directly obtaining information about the delivery speed of a fishing line caused by catching a fish into a fishing device during the trawling, the amount thereof, the condition of the tension applied to the fishing line and line winding, without the aid of a fishing person. Thus, an accurate and rapid vessel operation is allowed responding to the tug of a fish, enabling the fishing person to rapidly construct the winding condition of the fishing line.

SUMMARY OF INVENTION

This invention comprises, for achieving the purposes described above, a fishing device mounted on the deck of a trawling vessel, a sensor for detecting the delivery speed and winding speed of the fishing line of said fishing device, a sensor for detecting tension applied to said fishing line, a transmitter for transmitting fishing line information detected by each of said sensors, a receiver installed on the bridge of the trawling vessel for receiving and demodulating a transmitted signal from said transmitter, and indication part controlled by a demodulated signal from said receiver for indicating the length of said delivered and wound fishing line, a means for informing a vessel operator of the delivery and winding speed of the fishing line, a line tension indicating part controlled by the demodulated signal from said receiver for bar-indicating the tension of said fishing line, and a timer means starting to operate when a fish is caught by the fishing device.

BRIEF DESCRIPTION OF THE DRAWINGS

A detailed description of the invention will be made with reference to the accompanying drawings wherein like numerals designate corresponding parts in the several figures.

FIG. 5 is a block diagram showing a receiver in this invention.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention, since the scope of the invention is best defined by the appended claims.

Figure 1:
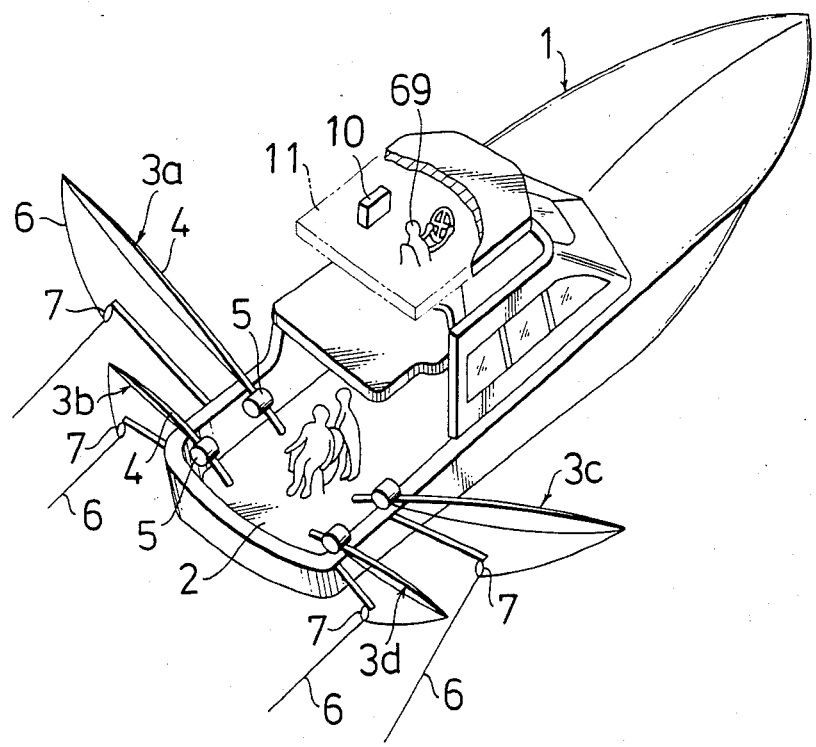
FIG. 1 is a diagram showing the relation between a trawling vessel and a fishing device to which this invention is applied.
Figure 2:
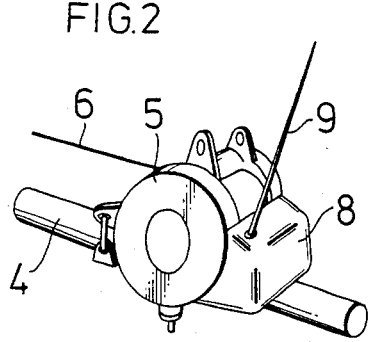
FIG. 2 is an oblique view showing a fishing reel in this invention.

FIG. 1 shows a relation between a trawling vessel and a fishing device applying this invention, wherein 1 denotes a vessel for trawling such as a cruiser on the deck 2 of which fishing devices 3a-3d for trawling are mounted. Said fishing devices 3a-3d comprise a trawling rod 4, a reel 5 mounted on the bat part thereof, and a fishing line 6 wound on the reel 5. The fishing line 6 drawn out from the reel 5 is taken through the tip of the rod 4 into the sea and clipped by a clip 7 mounted on the vessel edge. It is difficult to remove the holding force of the fishing line 6 caused by said clip with tension produced by the travelling of the vessel. Furthermore, a fishing device (not illustrated in the drawing) is connected to the tip of the fishing line 6 thrown into the water. Moreover, a transmitter 8 for transmitting data on the delivery of the fishing line 6 and the spool rotation for winding, and for transmitting data upon tension applied to the fishing line 6, is attached to said reel 5. This transmitter 8 is a watertight structure into which no water penetrates, even if seawater splashes on it. An antenna 9 such as that of a rod system is protruded on the transmitter 8. A receiver 10 is installed on a steering room 11 in which a vessel operator, i.e., a ship's captain, resides, for receiving a signal from said transmitter 8.

Figure 3:
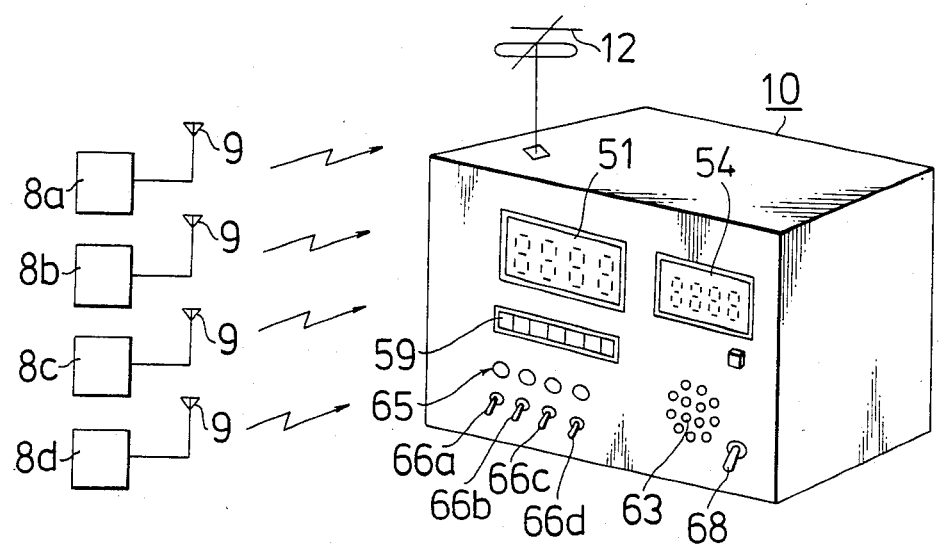
FIG. 3 is a diagram showing the relation between each transmitter and receiver in this invention.

FIG. 3 is a block diagram showing the relation between transmitters 8a-8d, each mounted on the reel 5 of each of said fishing devices 3a–3d, and the receiver 10 wherein the transmitting frequency of said transmitters 8a–8d differ from each other. For example, the transmitting frequency of the first transmitter 8a is set to 27.045 MHz, the second transmitter 8b to 27.095 MHz, the third transmitter 8c to 27.145 MHz, and the fourth transmitter 8d to 27.195 MHz, respectively. The transmitting signals issued from each of transmitting antennas 9 of said respective transmitters 8a–8d is received through an antenna 12 by the common receiver 10, and indications about the delivery and winding of a fishing line and tension applied to the fishing line, described later, are performed responding to transmitting data from the respective transmitters 8a–8d.

Figure 4:
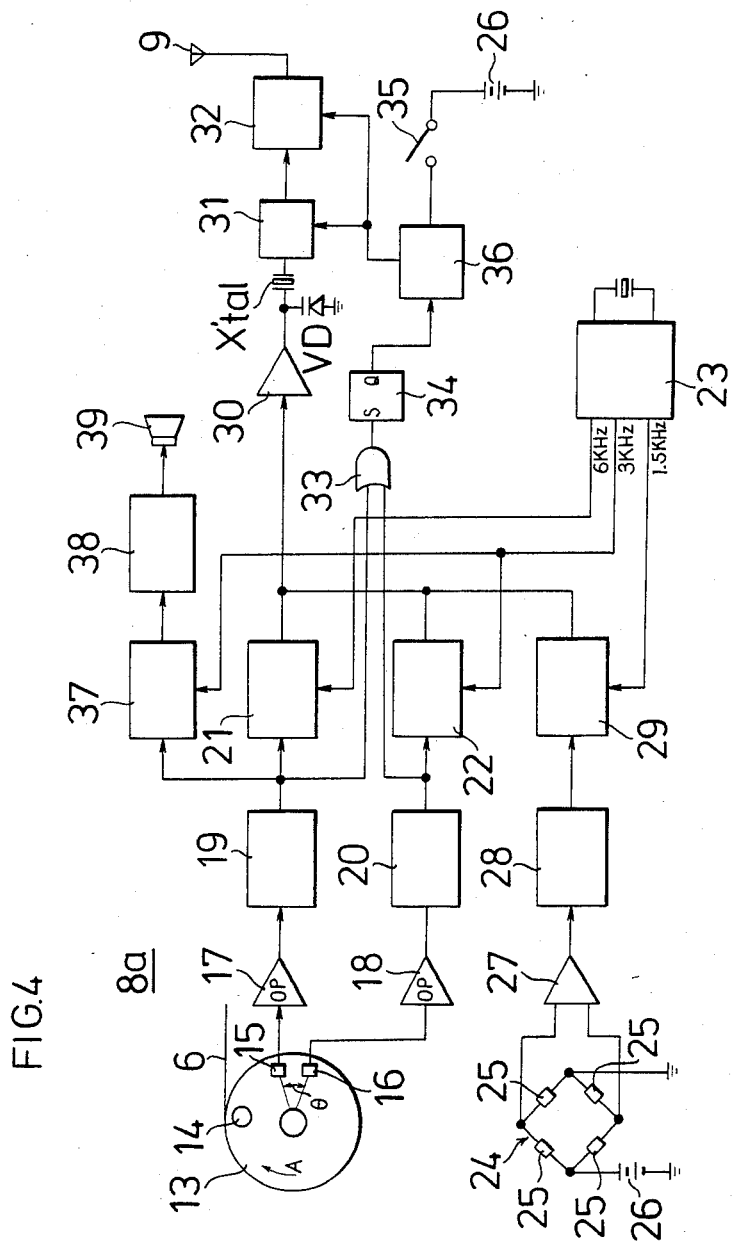
FIG. 4 is a block diagram showing an example of a transmitter in this invention.

FIG. 4 is a block diagram showing the concrete constitution of said first transmitter 8a. The second to fourth transmitters 8b–8d are, although differing in their transmitting frequency, are the same in their internal entities, so that the description of the first transmitter 8a is applicable to the description of transmitters 8b–8d. In FIG. 4 there is shown the spool 13 of the reel 5 on which the fishing line 6 is wound, and a magnet 14 is fixed on the periphery of said spool 13. A pair of Hall devices 15, 16 are arranged on the spool 13 facing said magnet 14. These Hall devices 15, 16, detecting the number of revolutions of the spool 13 and the positive rotation thereof (delivery direction of a fishing line), are arranged in the circumferential direction of the spool 13 with a prescribed phase difference $\theta$ to each other, whereby it is distinguished whether the fishing line 6 is drawn out or wound in the order of pulses issuing from the Hall devices 15, 16, depending on which of the Hall devices 15, 16 first faces the magnet 14. The output terminals of said Hall devices 15, 16 are connected to the inputs of respective OP amplifiers 17, 18, and further, the outputs of OP amplifiers 17, 18 are connected to the inputs of waveform shaping circuits 19, 20 for shaping pulse signals from the Hall devices 15, 16 into a prescribed pulse width comprising a one-shot multivibrator, etc., while the output signals from the waveform shaping circuits 19, 20 are applied to transmission gates 21, 22 as gate inputs, respectively. Furthermore, to these transmission gates 21, 22 signals having different frequency, e.g., 6 KHz and 3 KHz, sent from an oscillating circuit 23 provided with a frequency dividing circuit, are applied, respectively, and when said respective transmission gates 21, 22 are opened by a constant pulse width signal from said waveform shaping circuits 19, 20, said gates issue said 3 KHz, 6 KHz signals applied from said oscillating circuit 23 in bursts. These signals provide data representing the number of revolutions of a reel and the direction of rotation thereof. A tension sensor 24 for detecting tension applied to the fishing line 6, comprises four strain gauges 25 constructed into two bridges for sensing load applied to the shaft of the spool 13 when fishing with the fishing line 6 and, between connecting points, constituting one of said bridges, facing to each other, a DC power source 26 is connected. Between connecting points (output terminals) facing each other, being the other of said bridges, an OP amplifier 27 is connected. The output of said OP amplifier 27 is connected to the input of a waveform shaping circuit 28 comprising a monomultivibrator, etc. for shaping the output signal from the tension sensor 24 and the output signal of said waveform shaping circuit 28 is applied as the gate input of a transmission gate 29. To said transmission gate 29, the signal of, e.g. 1.5 KHz, is supplied from said oscillating circuit 23, and when said transmission gate 29 is opened by said signal from the waveform shaping circuit 28, said gate sends out in a burst the signal of 1.5 KHz applied from said oscillating circuit 23 for an interval corresponding to said signal width, allowing this signal to be a data representing tension applied to the fishing line. Respective input signals passing through said transmission gates 21, 22 and 29 are, after amplified by an amplifier 30, applied to an FM oscillating circuit 31 including a varactor diode VD and a crystal resonator X'tal. This FM oscillating circuit generates an FM modulated wave which changes frequency depending on the amplitude of an input signal, and said modulated wave is amplified by an amplifier 32 and sent out from the transmitting antenna 9. Further, the output signals of said waveform shaping circuit 19, 20 are applied to a flip-flop 34 via an OR gate 33, and the set output signal of said flip-flop 34 is applied as the switching input of a switching circuit 36 connected among said FM oscillator 31, amplifier 32 and DC power source 26 via a power source switch 35. Thereby, only when the spool 13 is turned, the switching circuit 36 is turned on to keep the FM oscillator 31 and the amplifier 31 in an operating state. A transmission gate 37 is triggered by the output signal of said waveform shaping circuit 19 to which the frequency signal of 3 KHz is applied from the oscillating circuit 23, and thereby, from the transmission gate 37, the signal of 3 KHz corresponding to the pulse width of a gate signal to be applied to said gate is sent out in a burst, while to the output of the transmission gate 37 a small piezo-effect type speaker 39 is connected via an amplifier 38, allowing a fishing person to be informed of the fact that the spool 13 is turned by the delivery or winding of a fishing line by permitting the speaker 39 to rumble once at every rotation of the spool 13.

Figure 6:
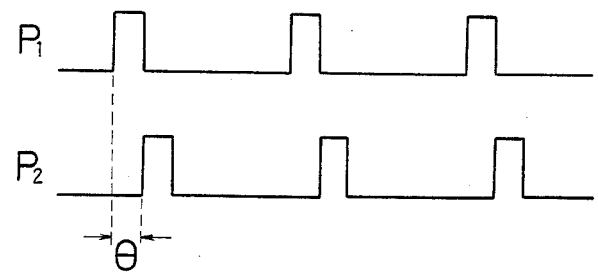
FIG. 6 is a drawing showing the output waveforms of a Hall device in this invention.

FIG. 5 is a block diagram showing the detail of said receiver 10 provided with a receiving band-pass filter 40 for selecting only a required signal frequency band from a signal received through the antenna 12 and to the output of said filter 40 an FM demodulating circuit 41 is connected. A phase control oscillator 42 is connected to said FM demodulating circuit 41 to permit the demodulating circuit 41 to select and output, in order, 4-channel demodulation signals corresponding to the transmitters 8a–8d while permitting said demodulating circuit 41 to cyclically tune in modulation frequency from the transmitters 8a–8d of said respective fishing devices 3a–3d. Filters 44, 45 and 46 corresponding to said 6 KHz, 3 KHz and 1.5 KHz are connected to the output of said demodulating circuit 41. An up and down counter 48 is connected to the outputs of said filters, 44, 45 via an adder 47. Said up and down counter 48 up-counts when the fishing line 6 is drawn out, and down-counts when it is wound up. A control signal for said up and down operation is issued from a phase detector 49 comprising a flip-flop, etc., which takes the output signal from the filter 44 as a set input, and that from the filter 45 as a reset input. By applying said control signal to the up and down setting input terminal U/D of the up and down counter 48, said counter 48 is subjected to up or down counting. Further, to this up and down counter 48, a digital indicator 51 in a meter or yard unit is connected via a decoder driver circuit 50. Moreover, said counter 48 counts one digit at every three rotations of spool. This is set taking, as a standard, the average value of the bobbin diameter of the spool 13, because it changes. To the outputs of said filters 44, 45 a flip-flop 53 is connected via an OR gate 52, and this flip-flop 53 sets, when reset by either of the output signals of the filters 44, 45 by said output signals, a digital timer indication 54 for counting and indicating time when fighting a fish. Said timer indicator 54 is subjected to a counting operation by a clock from a pulse generator 55, and counts from a time when a fish is caught by the fishing device of the fishing line 6 to a time when the fighting with a fish is completed, wherein the counting operation of the timer indicator 54 is automatically stopped when any winding and delivery of fishing line 6 are not performed over five minutes. Further, to the output of said filter 46 a level converting circuit 57 is connected via an amplifier 56 which converts a signal sent from the filter 46 to a DC level value by counting the pulse width of said signal. To the output of said level converting circuit 57, a bar-indicator 59 comprising LEDs indicating tension applied to the fishing line 6, is connected via a driver circuit 58. Further, to the output of said filter 44, a monomultivibrator 60 triggered by the output signal of said filter is connected, and to this output of said monomultivibrator 60 a transmission gate 61 gated by the output signal of said monomultivibrator is connected. To this transmission gate 61 a signal from an oscillator (not illustrated) having arbitrary frequency (e.g., 32 KHz) is applied, and thereby the transmission gate 61 sends out in a burst, a signal corresponding to the pulse width of a gate signal applied to said gate. This signal is applied to a piezo-effect type speaker 63 via an amplifier 62, allowing a vessel operator on the bridge to be informed that the fishing line is drawn out or wound up while permitting the speaker 63 to rumble at every rotation of the spool 13. A channel selecting circuit 64 is scan-operated by a clock having desired frequency (not illustrated) while it is operated by 4-channel signals outputted from said FM demodulating circuit 41, and the outputted signals thereof are applied as a signal for fixing, via a matrix 67, the oscillation frequency of said phase control oscillator 42 corresponding to any fishing device which has caught a fish, while it is supplied to a channel indicating part 65 for indicating which transmitting signal of fishing devices 3a-3d is received. Said channel indicating part 65 is constituted by light emission elements 65a-65d comprising LEDs corresponding to the fishing devices 3a-3d, and these light emission elements 65a-65d are cyclically turned on and off by a scanning clock applied to the channel selecting circuit 64, while those elements permit light emission diodes corresponding to the fishing devices 3a-3d to keep the on-and-off state thereof when a fish is caught by said devices, enabling a vessel operator to judge by which fishing device a fish was caught. Further, switches 66a-66d by which a vessel operator can arbitrarily select channels manually corresponding to said light emission diodes 65a-65d are provided and the signals of these switches 66a-66d are supplied to the phase control oscillator 42 via the matrix 67. A mode alteration switch 68 is provided for automatically or manually operating said channel indicating part 65. Here, the above-described digital indicator 51 for indicating the content of the up and down convertor 48, timer indicator 54, tension indicating bar-indicator 59, speaker 63, channel indicating part 65 and manual switches 66a-66d are, as shown in FIG. 3, mounted on the front panel of the receiver 10. The operation of this embodiment constructed as described is now described. When trawling by the sailing of the trawling vessel 1 under the condition that respective fishing devices 3a-3d connected as shown in FIG. 1 have been mounted on the vessel 1, respective transmitters 8a to 8d do not transmit, and also a receiver 10 is not operated when each of the fishing devices 3a-3d has not caught any fish. Further, only respective light emission elements 65a-65d of the channel indicating part 65 are cyclically turned on and off at that time. In such instance when an arbitrary fishing device, e.g., the fishing device 3a, is assumed to catch a fish, the fishing line 6 is separated from the clip 7 by the tug of the fish and drawn out in order to respond to the tug, allowing the spool 13 to be simultaneously turned. When the spool 13 is turned, each of Hall devices 15, 16 is operated by the magnet 14 turning in a body with said spool, allowing a pulse signal to be generated on the outputs of said elements. Then the spool 13 is turned in the positive rotation direction as shown by arrow A in FIG. 4, so that a pulse signal P1 (see FIG. 6) is first issued from the Hall device 15, allowing a pulse signal P2 (see FIG. 6) to be generated from the Hall device 16 delayed by $\theta$ from said signal P1. These respective pulse signals are, after amplified, shaped into constant width pulses by waveform shaping circuits 19, 20 and applied as gate input to transmission gates 21, 22; and 3 KHz, 6 KHz frequency signals from an oscillating circuit 23 pass through the transmission gates 21, 22 each time. Said gates 21, 22 are gated by the constant width pulse and on the output of said gates signals, appear in a burst. Then, the switching circuit 36 is turned on by a flip-flop 34 with the output of the waveform shaping circuits 19, 20 so that the FM oscillator 31 and the amplifier 32 are in an operating state. Accordingly, when bursted signals passing through the transmission gates 21, 22 are applied to the FM oscillator, said oscillator 31 issues an FM modulated wave responding to the input signals which is, after amplified, radiated from the antenna 9. Further, the speaker 39 rumbles at every rotation of the spool 31, allowing a fishing person to be informed that a fishing line 6 has been drawn out.

On the other hand, when line tension is applied to a spool shaft accompanying the tug of a fish, voltage responding to the line tension is generated on the tension sensor 24 comprising a strain gauge, and this voltage signal is, after amplified, shaped by a waveform shaping circuit 28 and applied, as a gate input, to the transmission gate 29. Thereby, when the transmission gate 29 is opened, 1.5 KHz frequency signal from the oscillating circuit 23 passes through said gate for a period responding to said gate pulse width, and when said signal is applied to the FM oscillator 31 via the amplifier 30, said FM oscillator 31 issues an FM modulated wave responding to said input signal allowing said FM modulated wave to be radiated through the amplifier 32 and the antenna 9. In the receiver 10 the light emission elements 65a-65d are cyclically turned on and off in order, by applying a signal from the channel selecting circuit 64 to the channel indicating part 65, and it is identified and indicated whether a fish is caught by the fishing devices 3a-3d. Simultaneously with this, the FM demodulating circuit 41 is scanned by the phase control oscillator 42 so as to be able to tune in by turns FM modulated wave from the transmitters 8a-8d of the fishing devices 3a-3d.

If a fish is caught by any fishing device during this scanning mode, the device is selected. Thus, if a fishing device first hit by a fish is the fishing device 3a, the device is identified and selected and the light emission diode 65a corresponding to said device is kept in a lit state while the scanning operation of the FM demodulating circuit 41 by the phase control oscillator 42 is stopped, such that only an FM modulated wave from the transmitter 8a of the hit fishing device 3a can be demodulated and the output of the phase control oscillator 42 is matched and fixed to a modulated wave from the transmitter 8a.

A signal received by the antenna 12 of the receiver 10 is, because of passing through the band pass-filter 40, allowed to pass only for those having a required frequency band, e.g., a 27 MHz band, and among them an FM modulated wave from the transmitter 4a of the fishing device 3a is demodulated by the FM modulating circuit 41, allowing the signals of the 6 KHz, 3 KHz and 15 KHz to be taken out. These demodulated signals act after extracted by the respective filters 44, 45 and 46 such that by adding the signal passing through the filters 44, 45 to the phase detector 49, the lead and delay of the output signal of the Hall device 15 against that of the Hall device 16 are detected, and if it leads, the up and down counter 48 is upcounted. In this situation, the output signal of the Hall device 15 leads that of the Hall device 16 and the fishing line 6 has been drawn out so that said counter is up-counted. Accordingly, the signals passing through the filters 44, 45 are, after added at the adder 47, applied to the up and down counter, allowing them to be counted in order while its now counted content is decoded by the decoder driver circuit 50, and by driving a driver with said decoded signal, the digital indicator 51 is actuated, permitting the counted content to be indicated in order in a meter or yard unit. Thus, the indicated content indicates the line length. Then, if the delivery speed of the fishing line is increased by the tug of a fish, the increment of the counted content becomes larger also responding to it. Accordingly, it can be judged by measuring the counting speed of the digital indicator 51 with a visual observation at what speed the fishing line has been drawn out. Thus, on the basis of the judgment, a vessel operator can operate a vessel in the direction where the delivery speed of the fishing line is reduced or in the direction where a fishing person is liable to wind up the fishing line 6. Furthermore, the up and down counter 48 starts to operate while, simultaneously, the flip-flop 53 is set by the output of the OR gate 52 operated by the signal of one or both of the filters 44, 45, and the time indicator 54 is allowed to start by the set output of the flip-flop 53. Thus, the timer indicator 54 counts and indicates the fighting time with a fish as soon as a fish is caught by the fishing device. Moreover, when a line tension signal passing through the filter 46 is applied to the level converting circuit 57, the signal width thereof is converted to a DC voltage level and, by adding said level to the bar-indicator 59 via the driving circuit 58, the tension applied to the line is bar-indicated. When a signal passing through the filter 44 is applied to the transmission gate 61 via the monomultivibrator 60, said transmission signal 61 is gated and, by applying a driving signal passing through said gate during said gating action to the speaker 63, said speaker 63 rumbles and an operator is informed through the sense of hearing that the fishing device 3a caught a fish. Consequently, a vessel operator 69 on deck can freely operate the vessel after the fishing condition is ascertained, without receiving indirect information from the fishing person, by knowing the indicated content of the digital indicator 5 on the front panel, the tension indicating state of the bar-indicator 59 for line tension, and a sound from the speaker 63 of the spool 13.

The above-described embodiment is provided for a situation wherein data is transmitted and received when a fish is caught by the fishing device 3a. The same description can be given for a situation wherein a fish was caught by any of the fishing devices 3b–3d; thus, a detailed description for situations wherein the devices 3b–3d are used has been omitted.

In this way, according to this invention, a transmitter for transmitting information such as the delivery speed of a fishing line, the amount thereof, the condition of line tension or line winding has been mounted on a trawling device; and on the vessel operating side, a receiver for receiving and indicating the above-described information has been provided so that a vessel operator can directly know information such as delivery speed of a fishing line caused by catching a fish with the fishing device during trawling, the amount thereof, the tension condition applied to the fishing line or line winding, without the aid of a fishing person, thus enabling the vessel operator to operate the vessel after the fighting condition of a fishing person who has caught a fish has been ascertained.

Intending to claim all novel, useful and unobvious features shown or described, we make the following claims:

1. A trawling line information communication system comprising a fishing device mounted on the deck of a trawling vessel, a sensor for detecting the delivery winding speed of the line of said fishing device, a sensor for detecting tension applied to said line, a transmitter for transmitting line information detected by each of said sensors, a receiver mounted on the operator side of the trawling vessel for receiving and demodulating a transmitted signal from said transmitter, an indication part controlled by a demodulated signal from said receiver for indicating the length of the delivery and winding of said fishing line, a means for informing a vessel operator of the delivery and winding speed of the fishing line, a line tension indicating part controlled by the demodulated signal from said receiver for bar-indicating the tension of the fishing line, and a timer means starting to operate when a fish is caught by said fishing device.

* * * * *